United States Patent [19]

Eder et al.

[11] Patent Number: 5,672,011
[45] Date of Patent: Sep. 30, 1997

[54] ROLLING BEARING FOR LINEAR MOVEMENTS

[75] Inventors: Jean Marie Eder, Woerth, France; Friedrich Holweg, Heroldsberg; Heinz Greiner, Ebersbach, both of Germany

[73] Assignee: Ina Walzlager Schaeffler KG, Germany

[21] Appl. No.: 388,613

[22] Filed: Feb. 14, 1995

Related U.S. Application Data

[63] Continuation of Ser. No. 204,131, Mar. 1, 1994, abandoned.

[30] Foreign Application Priority Data

Sep. 6, 1991 [DE] Germany ............... 41 29 619.2
Mar. 26, 1992 [DE] Germany ............... 42 09 824.6

[51] Int. Cl.$^6$ ................................................ F16C 29/06
[52] U.S. Cl. ........................................................ 384/45
[58] Field of Search ............................. 384/45, 43, 44; 464/168

[56] References Cited

U.S. PATENT DOCUMENTS 5,139,347  8/1992  Hattori ............................ 384/45
5,308,167  5/1994  Tsukada .......................... 384/45
5,344,237  9/1994  Takei et al. ..................... 384/45

FOREIGN PATENT DOCUMENTS 0211243  7/1986  European Pat. Off. .
3931351  3/1991  Germany .
2164708  3/1986  United Kingdom .

Primary Examiner—Lenard A. Footland
Attorney, Agent, or Firm—Bierman, Muserlian and Lucas LLP

[57] ABSTRACT

The invention concerns a rolling bearing for linear movements comprising a carrier which is displaceable along a guide rail and supported on two longitudinal sides of the guide rail on several pairs of rolling element circuits, a one-piece cage being associated with each longitudinal side and each rolling element circuit being comprised of a rectilinear row of load-transmitting rolling elements guided by the cage, a row of returning rolling elements arranged in a return passage in the carrier and two rolling element deflector arches connecting the two said rows at ends thereof, a part of each deflector arch being arranged in the one-piece cage as a continuation of the rectilinear row of rolling elements while another part of the deflector arch is arranged in a head piece disposed on an adjacent end face of the carrier.

10 Claims, 5 Drawing Sheets

ROLLING BEARING FOR LINEAR MOVEMENTS

PRIOR APPLICATIONS

This application is a continuation of U.S. patent application Ser. No. 204,131 filed Mar. 1, 1994, now abandoned.

The invention concerns a rolling bearing for linear movements comprising a carrier which is displaceable along a guide rail and supported on two longitudinal sides of the guide rail on several pairs of rolling element circuits, a one-piece cage being associated with each longitudinal side and each rolling element circuit being comprised of a rectilinear row of load-transmitting rolling elements guided by the cage, a row of returning rolling elements arranged in a return passage in the carrier and two rolling element deflector arches connecting the two said rows at ends thereof, a part of each deflector arch being arranged in the one-piece cage as a continuation of the rectilinear row of rolling elements while another part of the deflector arch is arranged in a head piece disposed on an adjacent end face of the carrier.

Such a rolling bearing is known from the document EP-A-0 427 238 and comprises two pairs of rolling element circuits for supporting the carrier on the guide rail so that four ball circuits with the balls which constitute the rolling elements are obtained. The load which can be transmitted by the carrier to the guide rail is limited by the four load-transmitting rolling element rows of the rolling element circuits. Therefore, with these four rolling element circuits, only a certain maximum static and dynamic load rating of the rolling bearing can be obtained. An increase of the load ratings by increasing the number of rolling element circuits with otherwise unchanged structural features of the rolling bearing, is, however, opposed by the difficulty encountered in designing the two cages each of which has to be made in one piece and accommodate several load-transmitting rows of rolling elements. If such a cage is to be made as an injection moulded part of a polymeric material, it would require complicated moulding tools. It is desirable to be able to injection mould and remove the workpiece from the mould in a simple manner using the simplest possible tool and without the need of additional mould slides. The cage for the known rolling bearing for two rows of load-transmitting rolling elements is made so as to be removable from the mould in the vertical direction.

The document EP-A-0 211 243 discloses a rolling bearing for linear movements with four rolling element circuits in which each of the cages is formed by two mutually aligned parallel retaining webs which abut together at their ends. The two load-transmitting rolling element rows of each pair of rolling element circuits are made at their other ends in one piece with the head piece. Such a component can be made in an injection moulding tool without slides and be removed therefrom in the longitudinal direction of the cage. In the most favourable case therefore, the tool path must be slightly larger than half the length of the cage and this leads to the disadvantage of large removal paths thus resulting in longer manufacturing cycle times in series production. This rolling bearing has the further disadvantage that in the installed state of the cages, the mould seam along the length of the cage leads to a reduction of stability which has to be compensated by additional fixing measures such as grooves extending in the longitudinal direction of the two cage halves or bores in which fixing pins are inserted.

The object of the invention is to provide a bearing which is simple to manufacture and to mount and which, with unchanged outer dimensions of its components, possesses a higher load rating and transverse rigidity so that a higher load transmission is possible. The invention also aims at achieving as uniform a loading capacity and rigidity as possible in all transverse directions of the bearing.

According to a first proposition of the invention, this abject is achieved by the fact that at least six rolling element circuits are disposed in three pairs on the carrier, the three load-transmitting rolling element rows in each cage are arranged parallel to and vertically above one another, and the cage comprises a lower web, above this, a guide rail-side web, above this, a carrier-side web, and above this, an upper web with no overlap between any of the webs in the horizontal direction. Such a cage can be manufactured as an injection moulded part in an injection moulding tool from which the cage can be removed in a horizontal direction at right angles to the longitudinal extent of the cage. Since the cage has only small dimensions in this direction, short cycle times are obtained for its manufacture in series.

According to a further proposition of the invention for a carrier with eight rolling element circuits in four pairs, the four load-transmitting rolling element rows in each cage are advantageously arranged parallel to one another in two planes which, as viewed in a cross-section, form an angle with each other, two rows of rolling elements separated by an intermediate web being associated with each plane, and the cage additionally comprises a lower web, obliquely above this, a central web, and obliquely above this, an upper web with no overlap between any of the webs in the horizontal direction. Such a cage is likewise simple to manufacture in an injection moulding tool without slides and with short cycle times.

Advantageously, the head pieces and/or the cages are made of a polymeric material which offers favourable manufacturing possibilities and a light construction of the cage components. A good possibility for assembling the carrier with the two cages and the two head pieces is obtained by the fact that the part of the rolling element deflector arch of each rolling element circuit located in the cage and the part located in the head piece each extends through an angle of 90°. Thus, between the head pieces and the ends of the cages extending out of the carrier in the direction of movement thereof, mould seams are formed which extend parallel to the direction of movement of the carrier so that the head pieces can be fixed endwise in this direction to the carrier previously provided with the two cages.

The head pieces preferably comprise inwardly projecting fixing pegs which fit into corresponding recesses in the cages. Thus, already when the head pieces have been slipped onto the front ends of the carrier with the simultaneous encompassing of the ends of the cages located in the carrier, a firm assembly of the components is obtained. The head pieces can then be fixed on the carrier by screws.

A further possibility of fixing is obtained by the provision of outwardly projecting fixing pegs formed in common on the head pieces and the cages by a part of each of these two components. A common plate with appropriate recesses into which the pegs fit can then be slipped onto all of these composite fixing pegs. In this way, a firm and stable construction of the rolling bearing is obtained.

The rolling element tracks of the load-transmitting rolling element rows on the guide rail and on the carrier can be arranged inclined as seen in cross-section so that they form pressure angles with the normals. The pressure angles of one pair of rolling element circuits can be different from those of another pair of rolling element circuits. With this configuration with differing pressure angles, the same load ratings and high tensile rigidity can be obtained for the tensile and the lateral loading of the bearing. The rolling element tracks can be ball tracks whose central tangents form pressure angles with the normals.

If four rows of balls, i.e. two pairs of rolling element circuits are provided, the bearing functions reliably even with non-rigid or inaccurately made connecting constructions.

It is also possible to arrange at least six rolling element circuits in three pairs one above the other on the carrier with the pressure angles of the central pair of rolling element circuits being larger than those of the upper and the lower pair of rolling element circuits. It is possible to make a bearing with six or more rows of balls at low cost because the same components can be used for its fabrication. A bearing with six rows of balls is particularly well suited for mounting in very precisely operating machine tools which are required to have high rigidity.

The pressure angle of the upper and the lower pair of rolling element circuits can be 45° for example, while that of the central pair can be 60°. The ball tracks of the load-transmitting rolling element rows on the guide rail and on the carrier can be arranged obliquely as viewed in cross-section, so that their central tangents form the same pressure angles with the normals in all the pairs of rolling element circuits.

Examples of embodiment of the invention are represented in the drawings and described more closely below.

Figure 1:
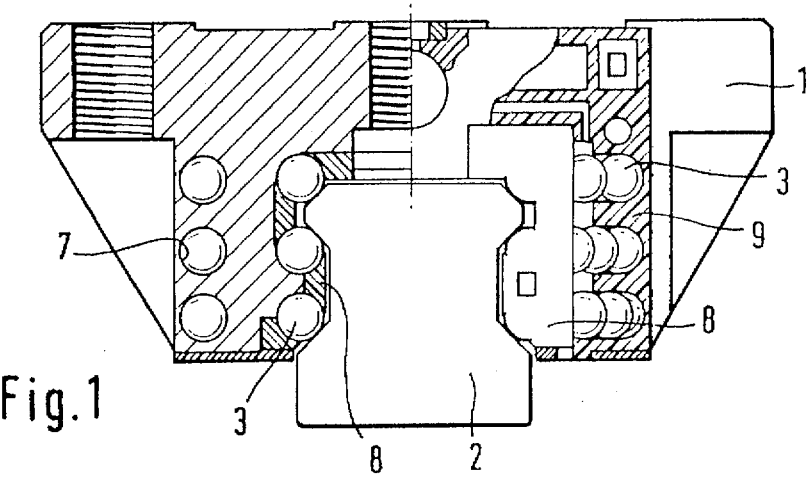
FIG. 1 is a cross-sectional view taken along line I—I of FIG. 2 at right angles to the direction of displacement and shows a rolling bearing assembly with a carrier which is displaceable along a guide rail which, however, is not hatch-lined in the drawing.
Figure 2:
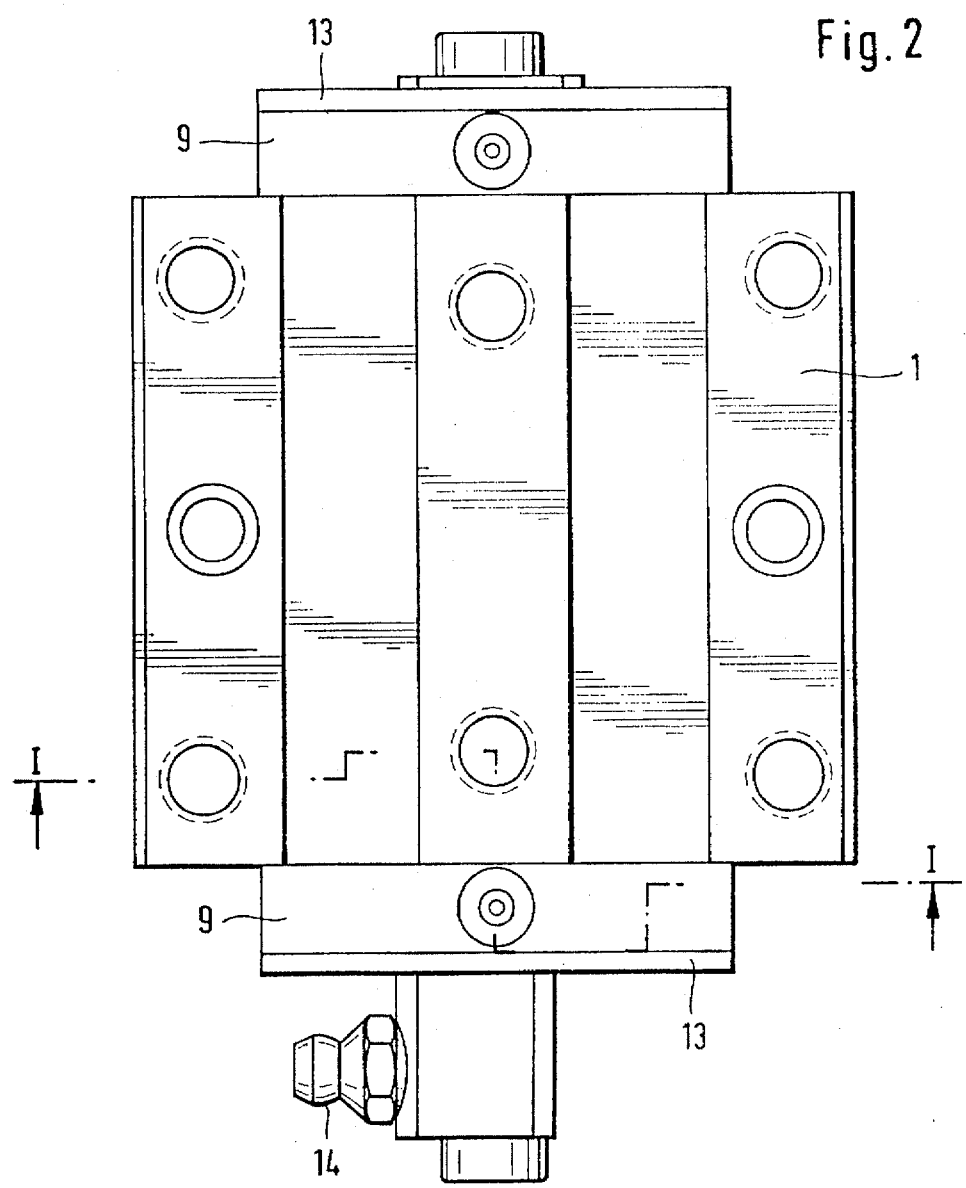
FIG. 2 is a top view of the carrier.
Figure 4:
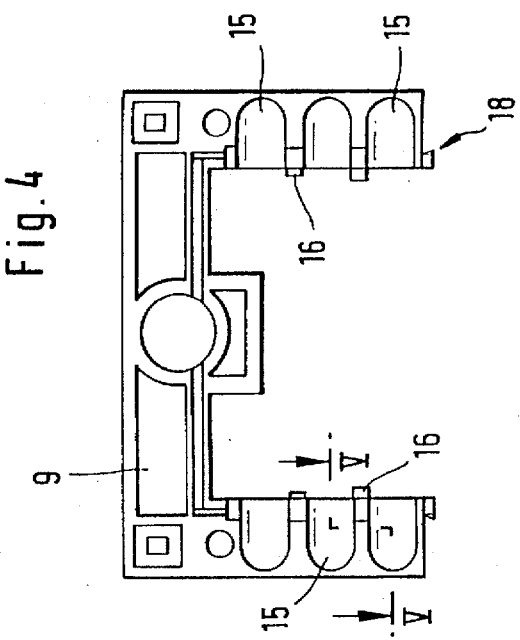
FIG. 4 is an inner view of an end face of a head piece of the rolling bearing assembly.
Figure 5:
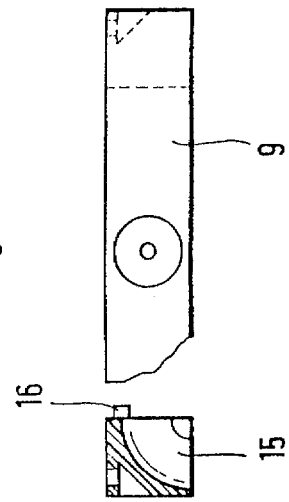
FIG. 5 is a top view of the head piece with a partial cross-section along line V—V of FIG. 4.
Figure 3:
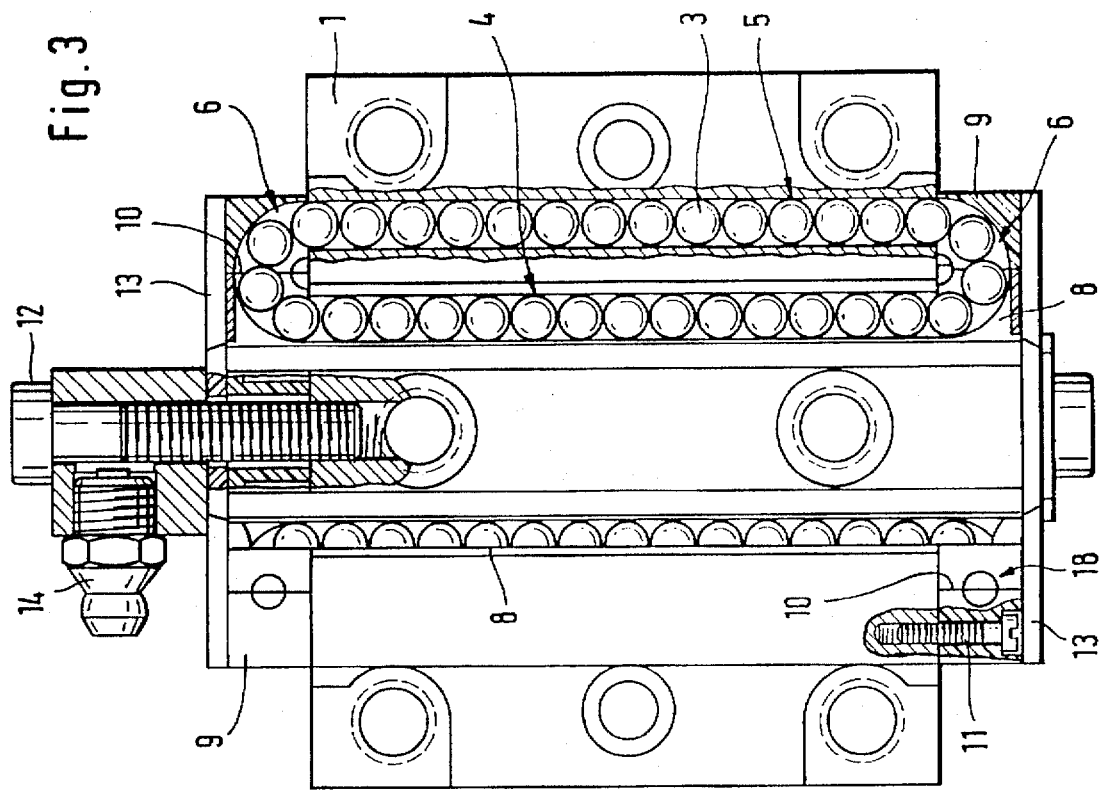
FIG. 3 is a bottom view of the carrier provided with rolling element circuits.
Figure 6:
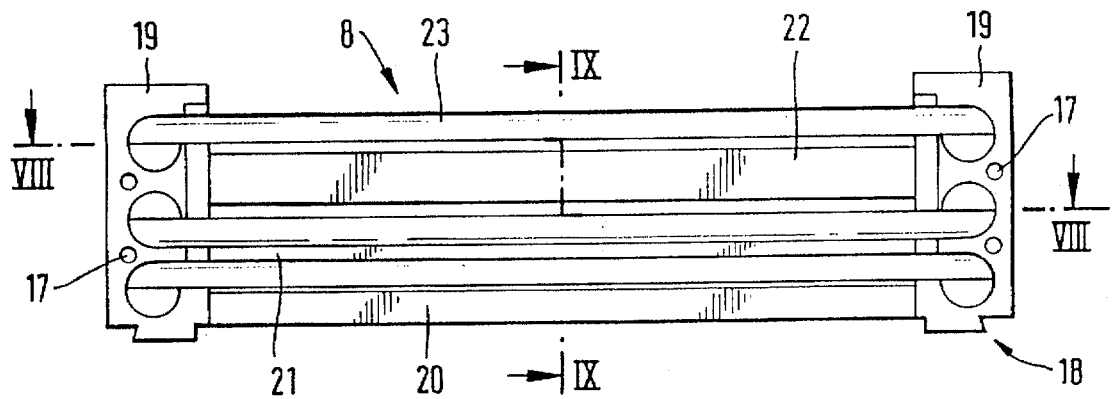
FIG. 6 is a side view of a cage of the rolling bearing assembly.
Figure 7:
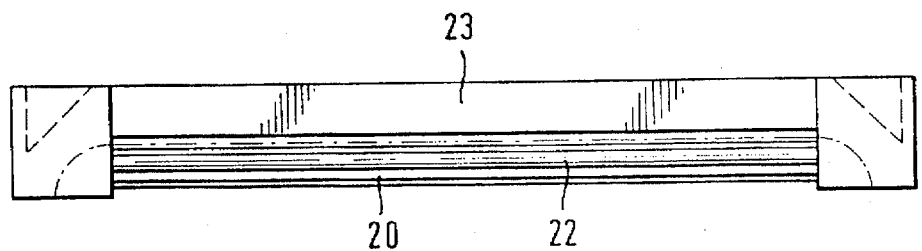
FIG. 7 is a top view of the cage.
Figure 8:
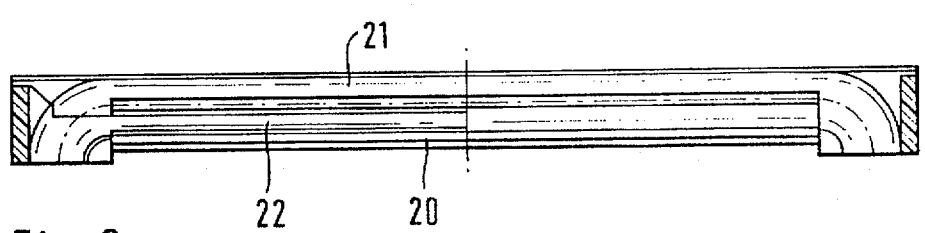
FIG. 8 is a horizontal section through the cage along line VIII—VIII of FIG. 6.
Figure 9:
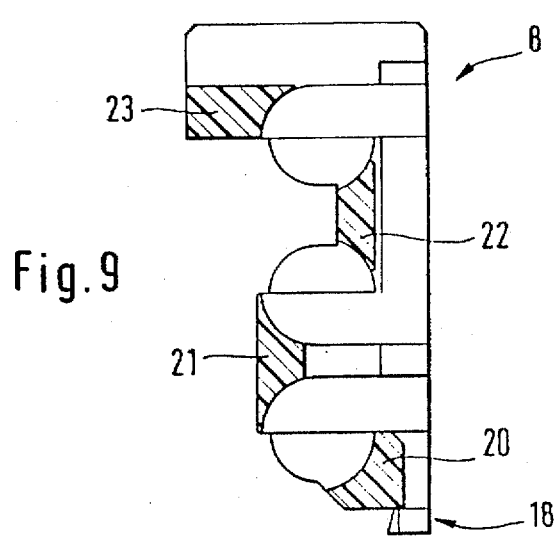
FIG. 9 is a vertical section through the cage along line IX—IX of FIG. 6 in an enlarged representation.

The rolling bearing assembly of FIGS. 1 to 3 comprises a carrier 1 which is mounted for displacement along a horizontal guide rail 2 on three pairs of rolling element circuits wherein the rolling element are balls 3 supported on tracks formed on the carrier 1 and on the guide rail 2, one rolling element circuit of each pair of rolling element circuits is arranged on one longitudinal side of the guide rail and the other rolling element circuit of the pair is arranged on the other longitudinal side of the guide rail 2. The three rolling element circuits of each side are arranged vertically above one another.

Each rolling element circuit comprises a load-transmitting row 4 of rolling elements, a returning row 5 of rolling elements parallel thereto, and two rolling element deflector arches 6 which are adjacent to the ends of the rolling element rows 4 and 5 and connect these rows with each other. During movement, the returning rows 5 of rolling elements pass through return passages 7 arranged in the carrier 1. The load-transmitting rows 4 of all three rolling element circuits of each side of the guide rail 2 are guided by a common cage 8. One such cage 8 is arranged on each side of the guide rail 2 in the carrier 1 and projects out of the carrier 1 in the direction of movement thereof at both ends where the rolling element row 4 transfers into the rolling element deflector arch 6.

The ends of the cages 8 projecting out of the carrier 1 at each front end thereof are surrounded by a head piece 9 in which the other part of the rolling element deflector arch is located. In this example of embodiment, the part of the deflector arch pertaining to the cage and the part pertaining to the head piece each extends through 90° so that a mould seam 10 extending parallel to the direction of movement of the carrier 1 is formed between the cage and the head piece 9. The head pieces 9 are fixed on the carrier 1 with the help of screws 11 while further screws 12 serve to secure scraper plates 13 and a lubricating nipple 14 on the carrier 1.

On the inside of each head piece 9 and arranged between arch-shaped passages 15 provided for the rolling element deflector arches 6 there are horizontally projecting fixing pegs 16 which are intended to engage in recesses 17 of the cages 8 and assure the fixing of the head pieces to the cages. Besides this, vertically projecting fixing pegs are formed on the head pieces 9 and together with corresponding partial pegs of the cages 8 with which they are integrated, they constitute the common fixing pegs 18. By the engagement of these fixing pegs 18 in recesses of a common mounting plate, a further mutual securing of the components of the rolling bearing assembly is obtained.

The cages 8 comprise several horizontal webs which are arranged one above the other within the carrier 1 and whose ends merge into common connecting pieces 19 outside the carrier 1. Thus for the guidance of the balls 3 of the load-transmitting row 4 of rolling elements, the cage 8 comprises a lower web 20, located above this on the guide rail-side, a web 21, above this on the carrier-side, a web 22 and above this an upper web 23. These webs arranged one above the other do not overlap in the horizontal direction so that after injection moulding, it is possible to remove the cage 8 from the mould in a horizontal direction at right angles to the longitudinal direction of the cage 8. The use of additional mould slides in the injection moulding tool can thus be avoided.

Figure 10:
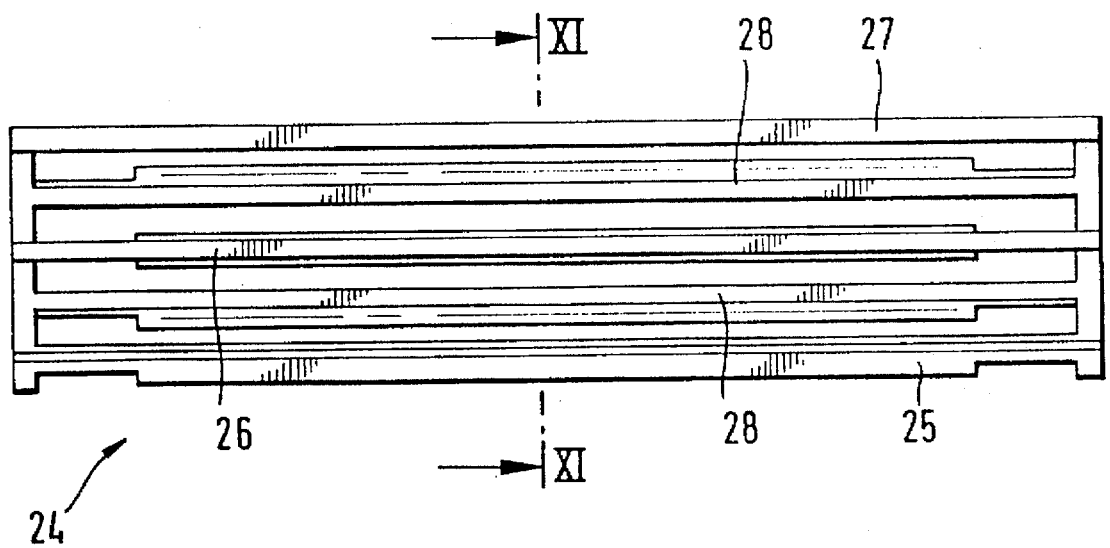
FIG. 10 is a side view of another cage.
Figure 11:
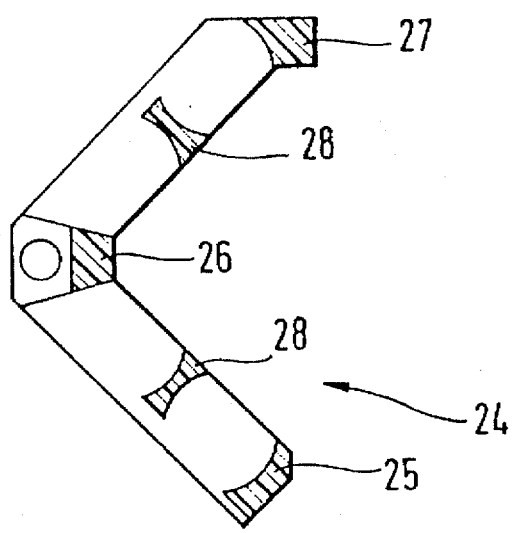
FIG. 11 is a vertical section along line XI—XI of FIG. 10 in an enlarged representation.

The cage 24 of FIGS. 10 and 11 also offers this advantage. This cage 24 comprises a lower web 25, a central web 26 and an upper web 27. An intermediate web 28 is located between the lower web 25 and the central web 26, and between the central web 26 and the upper web 27 respectively. All these webs are arranged above one another so that they do no overlap in the horizontal direction thus making it possible to injection mould the cage 24 in an injection moulding tool without additional mould slides.

Figure 12:
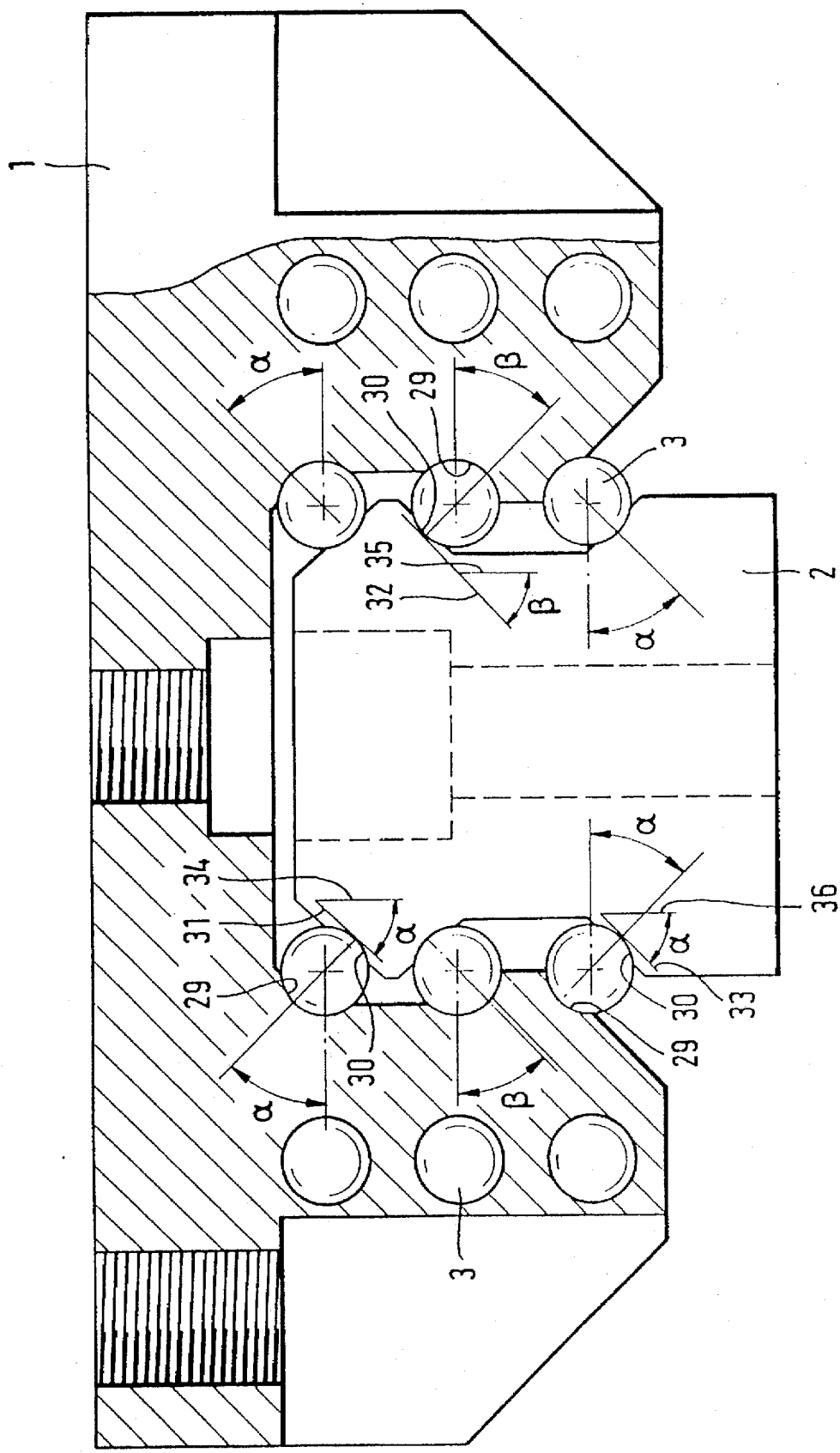
FIG. 12 is an enlarged cross-sectional view of the rolling bearing assembly of FIG. 1 with the cage omitted.

For a better understanding of the angular relationship of the ball tracks, the rolling bearing is represented on a larger scale in FIG. 12. The ball tracks for the load-transmitting rows of rolling elements, i.e. the ball tracks 29 on the carrier 1 and the ball tracks 30 on the guide rail 2, are inclined with respect to the normal.

These tracks are groove-shaped with curved surfaces to accommodate the balls 3 used as rolling elements. To be more precise, the central tangents 31, 32 and 33 of the ball tracks 30 extend at an angle to the normals 34, 35 and 36 respectively. These configurations are shown only for the rolling element tracks of the guide rail 2 but apply by analogy also to the rolling element tracks of the carrier 1.

In the present example of embodiment in which three pairs of rolling element circuits are arranged one above the other, the tangents 31 of the uppermost pair of rolling element circuits and the tangents 33 of the lowest pair of rolling element circuits form angles α with the normals 34 and 36 respectively while the tangents 32 of the central pair of rolling element circuits form angles β with the normals 35. In accordance with the invention, the angle β can be larger than the angle α. In keeping with the laws of geometry, and angle equal to the angle α is also formed between the normals of the tangents 31 and 33 extending through the centres of the balls 3 and the horizontal line, and an angle equal to the angle β is formed between the normal of the tangent 32 extending through the centre of the ball and the horizontal line.

We claim:

1. A rolling bearing for linear movements comprising a carrier (1) which is displaceable along a guide rail (2) and supported on two longitudinal sides of the guide rail (2) on plural pairs of rolling element circuits, a one-piece cage (8) being associated with each longitudinal side and each rolling element circuit being comprised of a rectilinear row (4) of load-transmitting rolling elements guided by the cage (8), a row (5) of returning rolling elements arranged in a return passage (7) in the carrier (1) and two rolling element deflector arches (6) connecting the two said rows at ends thereof, a part of each deflector arch (6) being arranged in the one-piece (8) cage as a continuation of the rectilinear row (4) of rolling elements while another pair of the deflector arch (6) is arranged in a head piece (9) disposed on an adjacent end face of the carrier (1), characterized in that at least six rolling element circuits are arranged in three pairs on the carrier (1), the three load-transmitting rolling element rows (4) in each cage (8) are arranged parallel to and vertically above one another, and the cage (8) comprises a lower web (20), above this, a guide rail-side web (21), above this, a carrier-side web (22) and above this, an upper web (23) with no overlap between any of the webs (20 to 23) in the horizontal direction.

2. A rolling bearing for linear movements comprising a carrier which is displaceable along a guide rail (2) and supported on two longitudinal sides of the guide rail (2) on plural pairs of rolling element circuits, a one-piece cage (24) being associated with each longitudinal side and each rolling element circuit being comprised of a rectilinear row of load-transmitting rolling elements guided by the cage (24), a row of returning rolling elements arranged in a return passage in the carrier and two rolling element deflector arches arranged adjacent to end faces of the carrier and connecting the two said rows at ends thereof, characterized in that eight rolling element circuits are disposed in four pairs on the carrier, the four load-transmitting rolling element rows in each cage (24) are arranged parallel to one another in two planes which, as viewed in a cross-section, form an angle with each other, two rows of rolling elements separated by an intermediate web (28) being associated with each plane, and the cage (24) additionally comprises a lower web (25), obliquely above this, a central web (26), and obliquely above this, an upper web (27) with no overlap between any of the webs (25 to 27) in the horizontal direction.

3. A rolling bearing of claim 1 or 2 wherein the head pieces (9) and/or the cages (8, 24) are made of a polymeric material, and the part of the rolling element deflector arch (6) of each rolling element circuit located in the cage (8, 24) and the part thereof located in the head piece (9) each extends through an angle of 90°.

4. A rolling bearing of claim 2 wherein the angle between the two planes of rolling element rows is 90°.

5. A rolling bearing of claim 1 wherein the head pieces (9) comprise inwardly projecting fixing pegs (16) which fit into corresponding recesses (17) in the cages (8), and outwardly projecting fixing pegs (18) are formed in common on the head pieces (9) and the cages (8) by a part of the head piece (9) and a part of the cage (8).

6. A rolling bearing of claim 1 wherein rolling element tracks of the load-transmitting rolling element rows on the carrier (1) and on the guide rail (2) are arranged inclined as seen in a cross-section so that they form pressure angles (α, β) with the normals (34, 35, 36), and the pressure angles (α) of one pair of rolling element circuits are different from the pressure angles (β) of another pair of rolling element circuits.

7. A rolling bearing of claim 6 wherein the rolling element tracks are ball tracks (29, 30) whose central tangents (31, 32, 33) form pressure angles (α, β) with the normals (34, 35, 36), and the pressure angles (β) of the central pair of rolling element circuits are larger than the pressure angles (α) of the upper and the lower pair of rolling element circuits.

8. A rolling bearing of claim 7 wherein the pressure angle (α) of the upper and the lower pair of rolling element circuits is 45° and the pressure angle (β) of the central pair of rolling element circuits is 60°.

9. A rolling bearing of claim 1 wherein the rolling element tracks of the load-transmitting rolling element rows on the guide rail (2) and on the carrier (1) are arranged inclined as viewed in a cross-section so that the said tracks of all pairs of rolling element circuits form the same pressure angles (α) with respective normals.

10. A rolling bearing of claim 9 wherein the rolling element tracks are configured as ball tracks (29, 30) whose central tangents (31, 32, 33) form pressure angles (α) with the normals (34, 35, 36).

* * * * *